United States Patent
Gross et al.

(10) Patent No.: US 6,800,371 B2
(45) Date of Patent: Oct. 5, 2004

(54) ADHESIVES AND ADHESIVE COMPOSITIONS CONTAINING THIOETHER GROUPS

(75) Inventors: Kathleen B. Gross, Woodbury, MN (US); Susan C. Noe, St. Paul, MN (US); Alphonsus V. Pocius, Maplewood, MN (US); William J. Schultz, Vadnais Heights, MN (US); Wendy L. Thompson, Roseville, MN (US)

(73) Assignee: 3M Innovative Properties Company, St. Paul, MN (US)

(*) Notice: Subject to any disclaimer, the term of this patent is extended or adjusted under 35 U.S.C. 154(b) by 11 days.

(21) Appl. No.: 09/801,234

(22) Filed: Mar. 7, 2001

(65) Prior Publication Data

US 2003/0017341 A1 Jan. 23, 2003

(51) Int. Cl.$^7$ ............................................... B32B 27/38
(52) U.S. Cl. ....................................... 428/413; 525/525
(58) Field of Search ................................ 428/413, 414, 428/418, 424.4, 425.8, 463, 446, 416; 525/525, 65, 107, 108, 524, 528, 939; 427/330; 524/871, 874

(56) References Cited

U.S. PATENT DOCUMENTS

| | | |
|---|---|---|
| 2,731,437 A | 1/1956 | Bender et al. |
| 4,104,283 A | 8/1978 | Hickner |
| 4,521,490 A | 6/1985 | Pocius et al. |
| 4,816,546 A | 3/1989 | Hefner, Jr. et al. |
| 5,225,486 A * | 7/1993 | Money et al. ............... 525/113 |
| 5,364,914 A | 11/1994 | Choate et al. |
| 5,405,731 A * | 4/1995 | Chandrasekaran et al. .. 430/260 |
| 6,180,200 B1 * | 1/2001 | Ha et al. ................... 428/64.1 |

FOREIGN PATENT DOCUMENTS

| | | |
|---|---|---|
| EP | 0 362 772 A2 | 4/1990 |
| EP | 0 774 476 A1 | 5/1997 |
| JP | 07-179564 * | 7/1995 |
| WO | WO 00/79582 A1 | 12/2000 |

OTHER PUBLICATIONS

Machine Translation and abstract, JP 07–179564, Kaji et al., Jul. 1995.*
Abstract, JP 2000303052, Oct. 31, 2000.
Abstract, JP 2000303053, Oct. 31, 2000.
Abstract, JP 2000026828, Jan. 25, 2000.
Abstract, JP 04175376, Jun. 23, 1992.
Abstract, JP 55164254, Dec. 20, 2000.
Handbook of Epoxy Resins, McGraw–Hill Book Company, 1967, pp. 16–1 to 16–32; and pp. 21–1 to 21–55.

* cited by examiner

*Primary Examiner*—David J. Buttner
*Assistant Examiner*—Christopher Keehan
(74) *Attorney, Agent, or Firm*—Scott A. Bardell

(57) ABSTRACT

In one aspect, the invention provides a curable composition comprising a mixture of epoxy resin, catalyst and an epoxy reactive thioether-containing compound and the resulting adhesives. The resulting adhesives are water and/or solvent resistant and bond to plastics such as ABS, polycarbonate, and PMMA; polyimide; noble metals such as gold and palladium; and silicon-containing materials such as silicon wafer die and silicon dioxide.

36 Claims, No Drawings

ADHESIVES AND ADHESIVE COMPOSITIONS CONTAINING THIOETHER GROUPS

FIELD OF THE INVENTION

This invention relates to adhesive compositions and adhesives containing thioether groups and bonded substrates using such adhesives.

BACKGROUND OF THE INVENTION

Epoxy structural adhesives, although widely used for a variety of applications, do have some deficiencies. One limitation of epoxy structural adhesives is their tendency to swell and in some cases degrade when exposed to water and/or solvents. For example, some of the known structural adhesives currently used in ink-jet cartridges absorb up to 10 percent by weight of the liquid ink components. This swelling will result in a drastic reduction in the glass transition temperature of the adhesive, converting the adhesive from a strong, structural adhesive into a weak elastomer that is unable to maintain bond strength. The water and/or solvent penetration into adhesives can also lead to chemical degradation because of reactions with water and/or solvent. The swelling and degradation of the structural adhesive eventually leads to interfacial failure of the adhesive-substrate bond. A highly swollen or degraded adhesive network provides a pathway for other components to migrate to and degrade an adhesive substrate interfacial bond. This mechanism can lead to corrosion of the substrate if corrosive ions migrate through the swollen adhesive.

A conventional method of reducing the sensitivity of an adhesive to swelling by water or solvents is to drive the network forming reaction to very high levels of crosslink density. High crosslink density generally leads to high glass transition temperatures and requires high cure temperatures. These factors can lead to high levels of interfacial stress between the adhesive and substrate if the substrate is a metal, glass or ceramic because the thermal expansion of amorphous organic resins such as epoxy resins is much higher than most metals, inorganic glasses or ceramics. For example, the coefficient of thermal expansion (CTE) for an epoxy resin below its glass transition is generally about 60 ppm/° C. The CTE for silicon is 2.6–2.8 ppm/° C. If a high modulus epoxy resin is bonded to a silicon die at a high temperature, a significant amount of interfacial stress is built up between the adhesive and silicon die. If the silicon die is large and thin, the result can be undesirable deformation or bowing of the die. If the die is rigid enough not to deform, the residual stress from the CTE mismatch is stored at the interface, weakening the bond.

Two factors that affect the interfacial stress in an adhesive-substrate bond are the CTE mismatch and the modulus of the adhesive. The problems associated with CTE mismatch can be alleviated through addition of a "flexibilizer" which lowers the modulus of the epoxy structural adhesive. The flexibilizer reacts, at least to some extent, with the epoxy resin during cure to provide flexibility in the polymer backbone. Typically, such flexibilizers are used to reduce the glass transition temperature, reduce the viscosity, and improve the ductility of the epoxy adhesive. The addition of a flexibilizer reduces the interfacial stress by increasing the rubbery or low modulus range of the adhesive and reducing the glassy or high modulus range of the adhesive. During much of the cooling cycle after the cure, the flexible adhesive will be in the rubbery/low modulus state, where interfacial stress is minimized. However, conventional flexibilizers such as polyalkylene oxide amines and epoxy terminated ethers render such adhesives particularly sensitive to water and/or solvent swelling and degradation.

Epoxy terminated polysulfides are another type of epoxy flexibilizers. While polysulfide polymers are known to have good fuel and moisture resistance, they typically contain chemically and thermally unstable disulfide and formal linkages, which make them unsuitable for many applications.

Another deficiency of epoxy resins is their limited adhesion to certain substrates. Epoxy resins are known to have excellent adhesion to some metals and good adhesion to some plastics. In general, epoxy-based adhesives do not provide good adhesion to non-polar plastics such as acrylonitrile-butadiene-styrene (ABS) polymers. The use of epoxy-terminated liquid polysulfide polymers in epoxy-based adhesives is known to improve adhesion to some types of substrates such as steel. However, epoxy-terminated liquid polysulfide polymers have not been demonstrated to improve adhesion to plastics such as ABS polymers, poly (methyl methacrylate) (PMMA) polycarbonate, polyimide, or silicon.

Thus, there remains a need for epoxy-based adhesives having improved water and solvent resistance and/or improved adhesion to difficult to bond substrates such as those made from ABS, poly(methyl methacrylate) (PMMA), polycarbonate, polyimide, silicon dioxide, and silicon die.

SUMMARY OF THE INVENTION

The invention provides epoxy resin adhesives that contain thioether segments incorporated into the crosslinked network. A "thioether segment" is defined as a divalent sulfur atom bonded to two carbon atoms. A segment may contain a sequence of two or more thioether groups bonded together. The thioether segments are incorporated into an epoxy resin adhesive by adding a thioether-containing flexibilizer to the adhesive composition. Generally, the more thioether segments incorporated into the flexibilizer and the fewer oxygen ether groups, the more the adhesives are resistant to swelling or absorption due to water and/or solvent exposure.

In one aspect, the invention provides a curable composition for making an adhesive containing thioether segments comprising a mixture of epoxy resin, catalyst and/or curative, and epoxy reactive thioether-containing compound. Preferred epoxy reactive thioether-containing compounds are the thioether di-epoxides. Preferred thioether di-epoxides include 2-{[3-({2-[(2-{[3-(2-oxiranylmethoxy) propyl]sulfanyl }ethyl)sulfanyl]ethyl}sulfanyl)propoxy] methyl }oxirane; 2({3-[(6-{[3-(2-oxiranylmethoxy)propyl] sulfanyl }hexyl)sulfanyl]propoxy}methyl)oxirane; and 2-({3-[(2-{[3-(2-oxiranylmethoxy)propyl] sulfanyl}ethoxyethoxyethyl)sulfanyl]propoxy}methyl) oxirane.

The epoxy reactive thioether-containing compounds described herein can be used to increase flexibility and reduce interfacial stress of the resulting adhesive but have a minimal negative impact on the water and chemical resistance of the adhesive.

Another aspect of the invention is a method of bonding a substrate comprising the steps of contacting the substrate with an adhesive composition comprising epoxy resin, epoxy reactive thioether-containing compound, and catalyst and/or curative, and curing the adhesive composition. The adhesive compositions of the invention provide adhesives having improved adhesion to substrates including those made from ABS polymers, polyimide, polycarbonate, poly (methylmethacrylate), silicon dioxide, and silicon die.

Another aspect of the invention provides an adhesive comprising the reaction product of epoxy resin, catalyst and/or curative, and epoxy reactive thioether-containing compound. The adhesives of the invention are cured adhesive compositions of the invention.

Other aspects of the invention are articles comprising adhesives comprising epoxy resin, epoxy reactive thioether-containing compound, and a curative bonded to substrates comprising silicon, plastic, metal, or combinations thereof.

Adhesion levels of the adhesives of the invention to plastics such as ABS and polycarbonate are in excess of those seen from epoxy-based adhesives that do not contain sulfur atoms or that contain epoxy-terminated polysulfide polymers. In addition, formulations containing epoxy reactive thioether-containing compounds have improved adhesion to polyimide and silicon dioxide passivated silicon wafer die than adhesives that contain polyalkylene oxide amines such as bis-3-aminopropylpolytetramethyleneoxide. Adhesives of the invention may be low stress and are water and solvent resistant.

DETAILED DESCRIPTION OF THE INVENTION

The incorporation of thioether segments into structural adhesive networks provides adhesives that are resistant to swelling and degradation by water and other solvents. These adhesives retain the desirable processing characteristics of epoxy adhesives but have significantly improved resistance to swelling and attack by solvents and water. The thioether segment containing adhesives of the invention also demonstrate very good adhesion to a variety of substrates that would otherwise be difficult to bond with a conventional epoxy resin-based adhesive.

Epoxy adhesives are known to adhere to a variety of polar substrates such as glass, ceramics, and metals very well, but do not adhere very well to most plastics and noble metals. The ability to widen the number of substrates that epoxy adhesives adhere to would widen the applications for these materials. The ability of such adhesives to adhere to substrates used in the microelectronics industry, such as silicon dioxide, silicon wafer dies, polyimide film, and noble metals such as gold, and to plastics such as ABS and polycarbonate, makes them very useful.

The addition of thioether segments into adhesive compositions provide a method of flexibilizing the adhesive without having a significant adverse affect on the resistance to swell and attack by water and/or organic solvents or corrosive liquids such as inks. The ability to flexibilize an adhesive is important in developing low stress adhesives. To achieve resistance to swelling by water and/or solvent containing liquids, high Tg-high crosslink density structural adhesive are generally used. However, such adhesives may be brittle and lack desirable adhesive characteristics. The high glass transition temperature/high modulus-adhesive may impose excessive thermal stresses on delicate electronic substrates. A high modulus over the entire range of a thermal cycle such as cooling from a high temperature cure can have the undesirable effect of causing the substrate to deform or bow. The ability to reduce the modulus or flexibilize the adhesive via the addition of flexible segment overcomes the lack of ductility and minimizes interfacial stress. Thioether flexibilizers are able to impart ductility and reduce interfacial stress without significantly increasing the susceptibility to swelling by water and other solvents or corrosive liquids.

The adhesive compositions of the invention contain at least one epoxy-reactive epoxy reactive thioether-containing compound. "Epoxy reactive" means that the thioether segments react with the epoxide via an addition reaction or copolymerization reaction and is incorporated into the cured epoxy network. Useful thioether containing compounds which exhibit improved adhesion to plastics and water and/or solvent resistance generally have a molecular weight in the range of from about 320 to about 650. Presently preferred epoxy reactive thioether-containing compounds for use as a flexibilizer in an epoxy resin are thioether di-epoxides. Thioether di-epoxides, for example, are effective flexibilizers that can be used to modify epoxy adhesives but will render them less susceptible to degradation by organic solvents and water than conventional flexible epoxies. Preferred thioether di-epoxides include 2-{[3-({2-[(2-{[3-(2-oxiranylmethoxy)propyl]sulfanyl}ethyl) sulfanyl]ethyl}sulfanyl)propoxy]methyl}oxirane; 2({3-[(6-{[3-(2-oxiranylmethoxy)propyl]sulfanyl}hexyl)sulfanyl] propoxy}methyl)oxirane; and 2-({3-[(2-{[3-(2-oxiranylmethoxy)propyl]sulfanyl}ethoxyethoxyethyl) sulfanyl]propoxy }methyl)oxirane, and combinations thereof. The epoxy reactive thioether-containing compound is present in the adhesive compositions of the invention at levels of from about 10 to about 80, preferably 10 to 55, more preferably 10 to 40 parts by weight.

Useful epoxy resins have the ability to cure with a variety of curatives and catalysts and process conditions to form hard very strong structural adhesives. Useful epoxy resins include those made from bisphenol, novolak, cresol novolak compounds, and other polyfunctional phenolic glycidyl ether epoxy resins. Presently preferred epoxy resins are diglycidyl ethers of bisphenol A, bisphenol F, bisphenol AF, bisphenol S, and combinations thereof. Presently preferred commercially available diglycidyl ethers of bisphenol A include TACTIX 123, DER 332 and 331, from The Dow Chemical Company, Midland Mich; and EPON 828 and RSL 1462, from Shell Chemical Company, Houston, Tex. Epoxy resins are present in the adhesive compositions of the invention in a range of about 20 to 80, preferably 40 to 80, more preferably 50 to 70 parts by weight.

A variety of curatives and catalysts are suitable to cure adhesive compositions containing the thioether precursor resins. As used herein, a "curative" is an epoxy reactive multifunctional material that copolymerizes with the epoxy resins via an addition polymerization and becomes covalently incorporated into cured resin composition and a "catalyst" is a component that causes the homopolymerization of the epoxy resin or accelerates the reaction of the epoxy resin with curatives. Epoxy reactive resins such as polyamines may act as both a curative and a catalyst. Frequently used epoxy curatives include multifunctional amines and hydrazides, polyfunctional phenolic curatives, multifunctional carboxycyclic acids, multifunctional mercaptans, and anhydrides. Anionic epoxy resin curatives, such as amines (for example, poly(oxyhydrocarbolene) diamines described in U.S. Pat. No. 4,521,490), are a common class of curatives used in these adhesive compositions. A presently preferred curative for two-part epoxy adhesive formulations is 4,7,10-trioxa-1,13-tridecanediamine. The curative can be present in an amount from 0.75 to 1.6 equivalents of —NH per epoxy equivalent and preferably in essentially stoichiometric amounts. At room temperature, curing takes place in about 6 hours to 7 days or longer.

Thioether-containing adhesive compositions cannot be cationically cured at room temperature, but can be catalytically cured with a variety of other catalysts. Catalytically cured epoxies are sometimes preferred to provide one-part epoxy resins. Various tertiary amines and transition metal complexes can be used as catalysts for the adhesive compositions. Imidazoles such as 2-methyl imidazole, imidazole, or blocked imidazoles are a preferred class of catalysts in these compositions. A presently preferred catalytically cured epoxy formulation contains a catalytic amount of 2-ethyl-4-methylimidazole in conjunction with "DEH 85", a phenolic epoxy curative resin available from The Dow Chemical Company. Catalysts may be present in the adhesive compositions of the invention in an amount of from about 0.1 to about 6 percent by weight.

Various other materials can be added to the composition, as is customary with formulating epoxy compositions, to alter or even improve the characteristics of the uncured or cured adhesive. Such materials include solvents, viscosity modifiers, filler, coupling agents, pigments, dyes, fibers, glass or plastic microbeads or bubbles, plasticizers, and flame retardants, such as antimony trioxide, extenders, toughening agents such as rubber toughening agents, conductive particles, for example, thermally and/or electrically conductive, microwave susceptors, antioxidants, UV stabilizers, and the like. Depending on the desired function of the additive, from traces to 100 percent or more by weight of the additive based on the weight of epoxide group-containing compound in the composition may be used. Preferred coupling agents are epoxy-reactive coupling agents such as glycidoxypropyltrimethoxysilane, aminopropyltrimethoxysilane, and mercaptopropyltrimethoxysilane. A preferred filler is spherical silica. Fumed silicas are generally preferred class of rheology control agents.

Generally, the adhesive compositions of the invention are made by first mixing epoxy resin with the epoxy reactive thioether-containing compound, combining a catalyst or catalyst mixture into the resin, adding any optional additives, and then heating the mixture at a suitable temperature for a suitable amount of time to cure the resin. The temperature and time profile for curing any particular adhesive composition is dependent upon the epoxy resin and catalyst or curative used. The techniques used to determine the appropriate temperature/time profile for curing an adhesive composition is well within the knowledge of those skilled in the epoxy adhesives art.

The adhesive compositions and the adhesives of the present invention can be used for bonding application that require a high degree of water and solvent resistance and/or bonding difficult substrates such as ABS polymers, polyimide, PMMA polymers, polycarbonates, or silicon die. The adhesive compositions and the adhesives of the invention can also be used to bond noble metals such as gold, platinum, palladium, silver, iridium, and combinations thereof. An adhesive composition of the invention is simply applied to substrate or substrates to be bonded, the substrates are joined, and the adhesive composition is thermally cured or crosslinked. For example, an adhesive composition of the invention is applied to a print head or an ink-jet cartridge, the print head and ink-jet cartridge are joined, and the adhesive composition is cured.

EXAMPLES

Unless otherwise noted, the individual components are available from chemical supply companies such as Aldrich Chemical Company, Inc., Milwaukee, Wis.

Glossary

RSL 1462 is commercially available diglycidyl ether of bisphenol A and was available from Shell Chemical Company, Houston, Tex.

Bis-3-aminopropylpolytetramethyleneoxide (PolyTHF diamine) is a polytetramethylene oxide diprimary amine having a number average molecular weight of 2,000 and was available from BASF Corporation, Parsippany, N.J.

SILSTAR LE-05S is a brand of fused spherical silica filler (CAS No. 60676-86-0) and was available from Nippon Chemical Industrial Co., LTD, Tokyo, Japan.

Epoxy silane is 3-glycidoxypropyltrimethoxysilane (CAS No. 2530-83-8) and was available from Aldrich Chemical Company, Inc., Milwaukee, Wis.

DMDS is dimercaptodiethyl sulfide, $HSC_2H_4SC_2H_4SH$, (CAS No. 3570-55-6) and was available from Itochu Specialty Chemical Inc., White Plains, N.Y.

1,6-Hexanedithiol (CAS # 1191-43-1) was available from Aldrich Chemical Company, Milwaukee, Wis.

1,8-dimercapto-3,6-dioxaoctane, DMDO, (CAS # 14970-87-7) was available from Itochu Specialty Chemicals, Inc., White Plains, N.Y.

D.E.H.® 85 is a phenolic epoxy curing agent (CAS No. 025036-25-3 & 000080-05-7) and was available from Dow Chemical Company, Midland Mich.

2E4MI is 2-Ethyl-4-Methylimidazole (CAS No. 931-36-2) and was available from Aldrich Chemical Company, Inc., Milwaukee, Wis.

Allyl glycidyl ether (CAS No.106-92-3) was available from Aldrich Chemical Company, Inc., Milwaukee, Wis.

IGRACURE 651 is a brand of 2,2-dimethoxy-2-phenylacetophenone, $C_6H_5COC(OCH_3)_2C_6H_5$, (CAS No. 24650-42-8) and was available from Ciba Specialty Chemicals, Tarrytown N.J.

ANCAMINE 1922A is 4,7,10-trioxa-1,13-tridecanediamine (CAS # 4246-51-9), an epoxy curative, and was available from Air Products and Chemicals, Inc., Allentown, Pa.

EPON 828 is a diglycidyl ether of bisphenol A and was available from Shell Chemical Company, Houston, Tex.

Adhesive Bond Test Methods

The adherents were of six types:
1. Silicon wafer die with silicon dioxide passivation
2. 2024-T3 bare aluminum (0.063 inch thick)
3. KAPTON E (0.002 inch thick), available from DuPont Corporation
4. ABS is an acrylonitrile-butadiene-styrene substrate 5 mm thick available as ROYALITE ABS (black) from Uniroyal, Sarasota, Fla.
5. PC is a polycarbonate substrate 5 mm thick available as LEXAN polycarbonate from GE Plastics, Minneapolis, Minn.
6. PMMA is a poly(methylmethacrylate) substrate 5 mm thick available as PLEXIGLAS from Rohm & Haas, Philadelphia, Pa.

Surface Preparations

The 2024-T3 bare aluminum alloy was surface prepared according to the phosphoric acid anodization process described in ASTM D3933-80 with the following modifications:

a. The alkaline degrease was OAKITE 164
b. The deoxidizer treatment was the FPL etch (as described in ASTM D2651-79 Paragraph 5.7, Method G)
c. The air dry was 10 minutes at ambient temperature
d. The force dry was 10 minutes at 155° F. (68° C.)

The Silicon Wafer die with silicon dioxide passivation was used as received.

The KAPTON E film was obtained as a single surface metalized film from Minnesota Mining and Manufacturing Company, St. Paul, Minn. The metallization had been completely removed by base etching and all adhesion testing was done on this previously metalized surface without additional preparation and treatment.

Peel Strength

Pieces of 2024-T3 bare aluminum were sheared into specimens that were 1×3 inches (2.54×7.62 mm) in size and the aluminum specimens were anodized as described above. Six specimens were placed side by side on a piece of aluminum foil and were taped to the aluminum foil by means of Teflon™ tape. A scraper was used to apply a 10 mil (0.25 mm) thick stripe of adhesive to the two inches of the assembly of panels that were not covered by the Teflon™ tape. The panels were separated by cutting the tape and a coating of ceramic beads having a median diameter of about 10 mils (0.25 mm) was sprinkled on the adhesive coating. The polyimide film described above was applied to the adhesive surface with the demetalized surface of the film facing the adhesive. The specimens were assembled on a piece of aluminum foil which was subtended by a piece of cardboard that in turn was subtended by a piece of thick aluminum plate. The specimens were then covered with another piece of aluminum foil and another piece of cardboard and the composite assembly was placed in a Carver press that had been pre-set at 130° C. The assembly was heated in the press for 10 minutes while maintaining light contact pressure applied on the assembly to keep the specimens aligned. After removal from the press, the coupons were allowed to cool to room temperature.

The polyimide film samples were slit down the center and then again at a distance of 0.375 inch (9.5 mm) from the center to create two 3/8 inch (9.5 mm) wide strips for peel testing.

The sample was affixed to a 90° peel fixture (similar to that shown in FIG. 9.8 in A. V. Pocius, *Adhesion and Adhesives Technology, An Introduction*, Hanser Publishers, Munich, 1997) and the sample was peeled at 0.01 inch/minute (0.25 mm/minute) and the sample was peeled for a distance up to 0.1 inch (2.54 mm) or until the point when a steady peel force value was obtained. Peel force is reported in pounds force per inch width (N/254 cm), which was calculated by dividing peel strength by the width of the sample.

Die Shear

A specimen of 2024-T3 aluminum was sheared into a size of 1×1.5 inch (2.5×3.8 mm). It was anodized according to the procedure described above. Silicon wafer die were diced from a larger wafer into 2.8 mm square die.

Flat gaskets of Teflon™ film were punched from a 1 mil (0.025 mm) thick film. The gaskets were 4.8 mm in outside diameter and 2.5 mm in inside diameter. Drops of adhesive were assembled in a row along one edge of a face the aluminum panel. The Teflon™ gaskets were placed over the adhesive such that the drop fit within the hole in the gasket and a die was placed on the adhesive. The assembly was placed in a press designed for applying heat and pressure to electronic assemblies and the adhesive was cured at 130° C. for 10 minutes. After removal from the press, the specimens were allowed to cool to room temperature.

The die shear strength was determined using a DAGE 2400 PC Die Shear Strength Tester (available from Dage Precision Industries, England) following the die shear strength procedures outlined in the equipment manual. The values of die shear force were obtained in kilograms of force required to push the sample out of position. The die shear strength was calculated by dividing the measured shear force by the bonded area that was calculated to be 0.049 cm$^2$.

Overlap Shear Test

Unless otherwise specified, plastic substrates were prepared by wiping three times with a 50:50 isopropyl alcohol:distilled water mixture. Overlap shear was measured on 25.4 mm wide specimens with a 12.7 mm long overlap. Three specimens were tested for each sample type. Glass beads, 0.25 mm in diameter, were added to the composition at approximately 1 weight percent so as to function as spacers to ensure a 0.25 mm bond line. Testing was done at a grip separation rate of 0.25 mm/min on an Instron Model 4465 Materials Test System (Canton, Ohio).

Qualitative Adhesion Test

Qualitative Adhesion Test samples were made by placing a glob of adhesive, approximately 2 cm in diameter, on the test substrate of interest. The thickness of the glob was determined by surface tension. After cure, a razor blade was used to try to remove the glob. At least two specimens were tested for each sample type.

An adhesive was classified as "easy" to remove if the glob could be peeled from the substrate by inserting the razor blade between the glob and the substrate a distance of approximately 2–4 mm from the edge and then tipping the razor blade away from the substrate. An adhesive was classified as "fairly easy" to remove if the test results were between "easy" and "difficult" classifications. An adhesive was classified as "difficult" to remove if the razor blade needed to be pushed between the glob and the substrate in order to advance the peel front. An adhesive was classified as "stuck" if all efforts to remove it via hand using a razor blade resulted only in cutting off pieces of adhesive or cutting out pieces of substrate (i.e., no interfacial failure could be generated).

Unless otherwise specified, plastic substrates were prepared by wiping three times with a 50:50 isopropyl alcohol:distilled water mixture.

Glass Transition Temperature Measurement

Glass Transition (Tg) values were either obtained from a Differential Scanning Calorimeter (DSC) or from dynamic mechanical tests. The DSC tests were carried out on a Thermal Analysis TA 2100 instrument. Sample sizes ranged from 2–10 mg and were typically heated from 25° C. to 225° C. at 10° C./minute. The Tg was taken to be the half-height of the step transition.

Alternatively, Glass Transition (Tg) values were taken as the maximum in the tan delta obtained from dynamic mechanical tests (DMTA) done at a frequency of 1 Hz using a Rheometrics RSA II (Piscataway, N.J.) dynamic mechanical tester in film mode, heating in 3° C. steps with a 15 second dwell. The samples for DMTA testing were prepared by casting adhesive into a mold with an opening 12.7 mm wide and 0.8 mm deep and approximately 50 mm long. The mold was made by cutting an opening in silicone rubber tape (SNS 440S Solid from CHR Industries, New Haven, Conn.), and sticking the tape to release-coated polyester film.

Example 1

Example 1 describes the preparation of Experimental Compound 1, 2-{[3-(t2-[(2-{[3-(2-oxiranylmethoxy)propyl]

sulfanyl}ethyl)sulfanyl]ethyl}sulfanyl)propoxy]
methyl}oxirane (Structure 1.)

DMDS (50.01 g), allyl glycidyl ether (16.72 g), and IRGACURE 651 initiator (0.08 g) were shaken together in a glass jar until the initiator was dissolved. The solution was irradiated under two GTE 15W Sylvania 350 nm bulbs for two hours, during which time it was occasionally shaken. Compound 1, shown as Structure 1, was recovered by concentration of the reaction mixture in vacuo at 80° C. to remove excess allyl glycidyl ether, and was used without further purification. NMR analysis of the isolated product indicated that all mercapto and olefin functionalities had reacted.

Structure 1

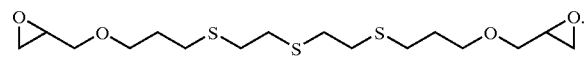

Example 2

Example 2 describes the preparation of Experimental Compound 2, 2({3-[(6-{[3-(2-oxiranylmethoxy)propyl]sulfanyl}hexyl)sulfanyl]propoxy}methyl)oxirane (Structure 2.)

1,6-Hexanedithiol (10.50 g), allyl glycidyl ether (16.72 g), and IRGACURE 651 initiator (0.08 g) were shaken together in a glass jar until the initiator was dissolved. The solution was irradiated under two GTE 15 W Sylvania 350 nm bulbs for two hours, during which time it was occasionally shaken. Compound 2, shown as Structure 2, was recovered by concentration of the reaction mixture in vacuo at 80° C. to remove excess allyl glycidyl ether, and was used without further purification. NMR analysis of the isolated product indicated that all mercapto and glycidyl ether functionalities had reacted.

Structure 2

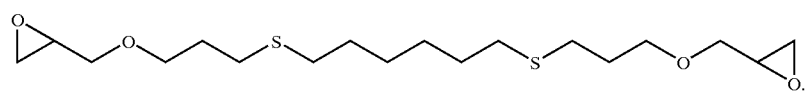

Example 3

Example 3 describes the preparation of Experimental Compound 3,2-({3-[(2-{[3-(2-oxiranylmethoxy)propyl]sulfanyl}ethoxyethoxyethyl)sulfanyl]propoxy}methyl)oxirane (Structure 3.)

1,8-dimercapto-3,6-dioxaoctane (42.5 g); allyl glycidyl ether (55.9 g); and IRGACURE 651 initiator (0.26 g) were shaken together in a glass jar until the initiator was dissolved. The solution was irradiated under two GTE 15W Sylvania 350 nm bulbs for two hours, during which time it was occasionally shaken. Compound 3, shown as Structure 3, was recovered by concentration in vacuo at 80° C. to remove excess allyl glycidyl ether, and was used without further purification. NMR analysis of the isolated product indicated that all mercapto and olefin functionalities had reacted.

Structure 3

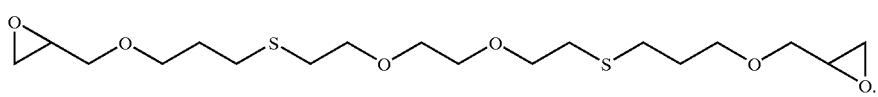

Example 4

Example 4 describes the preparation of a silica filled adhesive containing Experimental Compound 1. RSL 1462 and D. E. H. 85 were heated at 125° C. and mixed until a clear homogeneous was obtained. The solution was cooled to 25° C. and the remaining ingredients excluding 2E4MI were added and stirred for approximately 15 minutes under vacuum. The liquid 2E4MI was then added and stirred for several minutes to fully dissolve the catalyst in the adhesive composition. The amounts of the materials used to prepare Adhesive Compositions 1 and 2 are shown in Table 1.

TABLE 1

| Adhesive Compositions | RSL 1462 | Experimental Compound 1 | D.E.H. 85 | SILSTAR LE-05 | Epoxy Silane | 2E4MI |
|---|---|---|---|---|---|---|
| 1 | 40 g | 8.0 g | 4.0 g | 34.7 g | 0.53 g | 2.17 g |
| 2 | 40 g | 8.0 g | 4.0 g | 34.7 g | — | 2.17 g |

Comparative Example 1

Comparative Example 1 describes the preparation of silica filled adhesives that contain a typical flexibilizer for epoxy resins, PolyTHF diamine. Comparative Adhesive Compositions C1 and C2, the compositions of which are shown in Table 2, were prepared by a process identical to that used for Adhesive Compositions 1 and 2.

TABLE 2

| Compositions | RSL 1462 | Poly THF diamine | D.E.H. 85 | SILSTAR LE-05 | Epoxy Silane | 2E4MI |
|---|---|---|---|---|---|---|
| C1 | 40 g | 8.0 g | 4.0 g | 34.7 g | 0.53 g | 2.16 g |
| C2 | 40 g | 8.0 g | 4.0 g | 34.7 g | — | 2.16 g |

Adhesive Compositions 1 and 2 and Comparative Adhesive Compositions C1 and C2 were tested for resistance to swelling by measuring their weight gain in a 96/4 mixture of water/n-butanol. A degassed portion of each sample composition was poured into a 10 cm×10 cm×0.16 cm vertical mold preheated to 130° C. and the samples cured for 20 minutes at 130° C. to obtain fully cured 0.16 cm thick resin bricks. Specimens approximately 1.5 cm×1.5 cm were cut from the bricks and dried in a 100° C. vacuum oven at 2 torr for 2 hours. The specimens were then carefully weighed and immersed in a vessel containing a 96/4 water/n-butanol solution. The vessel was sealed and placed in a 60° C. oven. The specimens were periodically removed, rinsed with water, carefully dried with a paper towel, and weighed. The increase in weight, which is an indication of the specimen's susceptibility to swelling, is recorded as a percent increase over the original weight. The results are reported in Table 3.

TABLE 3

| Adhesive Composition | 2 Day % Swell | 7 Day % Swell |
|---|---|---|
| 1 | 1.30% | 1.61% |
| 2 | 1.08% | 1.30% |
| C1 | 1.96% | 2.28% |
| C2 | 1.61% | 1.90% |

The data in Table 3 indicate that cured samples made from Adhesive Compositions 1 and 2, which contain Experimental Compound 1, exhibit lower weight gains and hence are more resistant to swelling in water/n-butanol than those made from Comparative Adhesive Compositions C1 and C2, which contain a typical epoxy flexibilizer.

Adhesive Compositions 1 and 2 and Comparative Adhesive Compositions C1 and C2 were used to prepare bonds of a silicon dioxide passivated silicon wafer die to 2024-T3 anodized aluminum and to prepare 90° peel specimens of polyimide film to 2024-T3 anodized aluminum. These adhesive tests are described in the Test Methods section above and the results of the tests are reported in Table 4.

TABLE 4

| Sample | Room Temperature Peel Strength (N/cm width) (lb/in width) | Room Temperature Die Strength (kg/cm²) |
|---|---|---|
| 1 | 11.4 ± 3.0 (6.5 ± 1.7) | 590 ± 58 |
| 2 | 13.3 ± 3.9 (7.6 ± 2.2) | 435 ± 72 |
| C1 | 4.0 ± 0.7 (2.3 ± 0.4) | 48 ± 7.4 |
| C2 | 5.6 ± 0.7 (3.2 ± 0.4) | 80 ± 45 |

The data in Table 4 clearly demonstrate that Comparative Examples C1 and C2 are to the Adhesive Compositions 1 and 2 in adhesive strength as measured by die shear strength.

Example 5

Example 5 describes the preparation of Adhesive Compositions containing Experimental Compounds 1, 2, and 3 and no silica filler. Adhesive Compositions 3–16, the compositions of which are shown in Table 5, were prepared according to the procedure described in Example 4. The various components of each sample were added to aluminum pans and mixed by hand. The pans were then heated in an oven at 80° C. for 1 hour, 120° C. for 1 hour, and 175° C. for 1 hour to cure the Adhesive Compositions.

TABLE 5

| Adhesive Compositions | RSL 1462 | Experimental Compound 1 | Experimental Compound 2 | Experimental Compound 3 | D.E.H. 85 | 2E4MI |
|---|---|---|---|---|---|---|
| 3 | 4.50 g | 0.495 g | — | — | 0.50 g | 0.22 g |
| 4 | 4.01 g | 1.015 g | — | — | 0.499 g | 0.22 g |
| 5 | 3.50 g | 1.52 g | — | — | 0.49 g | 0.22 g |
| 6 | 3.02 g | 2.0 g | — | — | 0.502 g | 0.23 g |
| 7 | 2.51 g | 2.5 g | — | — | 0.499 g | 0.22 g |
| 8 | 4.52 g | — | 0.496 g | — | 0.505 g | 0.235 g |
| 9 | 4.00 g | — | 0.995 g | — | 0.50 g | 0.227 g |
| 10 | 3.51 g | — | 1.51 g | — | 0.51 g | 0.2205 g |
| 11 | 2.99 g | — | 2.0 g | — | 0.52 g | 0.218 g |
| 12 | 2.50 g | — | 2.51 g | — | 0.53 g | 0.22 g |
| 13 | 4.50 g | — | — | 0.49 g | 0.53 g | 0.224 g |
| 14 | 4.02 g | — | — | 0.997 g | 0.51 g | 0.22 g |
| 15 | 3.50 g | — | — | 1.52 g | 0.499 g | 0.219 g |
| 16 | 2.56 g | — | — | 1.73 g | 0.43 g | 0.169 g |

Comparative Example 2

Comparative Adhesive Compositions C3–C10, the compositions of which are shown in Table 6, contain typical commercially available epoxy flexibilizers and were prepared by a process identical to that described in Example 4. The resin mixtures were poured into 4 inch×4 inch×1/16 inch molds and cured by heating in an oven at 80° C. for 1 hour, 120° C. for 1 hour, and 175° C. for 1 hour.

TABLE 6

| Compositions | RSL 1462 | Poly THF 2100 | ZZL-0822 | DER 732 | D.E.H. 85 | 2E4MI |
|---|---|---|---|---|---|---|
| C3 | 90.0 g | 10.0 g | — | — | 10.0 g | 4.6 g |
| C4 | 80.0 g | 20.0 g | — | — | 10.0 g | 4.6 g |
| C5 | 70.0 g | 30.0 g | — | — | 10.0 g | 4.6 g |
| C6 | 90.0 g | — | 10.0 g | — | 10.0 g | 4.6 g |
| C7 | 80.0 g | — | 20.0 g | — | 10.0 g | 4.6 g |
| C8 | 180.0 g | — | — | 20.0 g | 20.0 g | 9.2 g |
| C9 | 160.0 g | — | — | 40.0 g | 20.0 g | 9.2 g |
| C10 | 140.0 g | — | — | 60.0 g | 20.0 g | 9.2 g |

Comparative Adhesive Compositions C11–C16, the compositions of which are shown in Table 7, contain Morton International epoxy terminated polysulfide resins and were prepared by a process identical to that described in Example 4. The samples were prepared in aluminum pans and mixed by hand. The pans were then heated in an oven at 80° C. for 1 hour, 120° C. for 1 hour, and 175° C. for 1 hour to cure the Comparative Adhesive Compositions.

TABLE 7

| Compositions | RSL 1462 | ELP 612 | ELP 3 | D.E.H. 85 | 2E4MI |
|---|---|---|---|---|---|
| C11 | 4.48 g | 0.52 g | — | 0.50 g | 0.23 g |
| C12 | 4.00 g | 1.09 g | — | 0.51 g | 0.24 g |
| C13 | 3.52 g | 1.52 g | — | 0.50 g | 0.22 g |
| C14 | 4.52 g | — | 0.51 g | 0.51 g | 0.23 g |
| C15 | 4.06 g | — | 1.02 g | 0.51 g | 0.22 g |
| C16 | 3.55 g | — | 1.52 g | 0.51 g | 0.24 g |

The swelling of Adhesive Compositions 3–16 and Comparative Adhesive compositions C3–C10 was characterized by measuring the weight gain of the samples in a 96/4 mixture of water/n-butanol and in Lexmark cyan ink. The cyan ink is from Lexmark's colored ink jet cartridge, part number 12A1980. Specimens weighing approximately 0.3 g were cut from the 1/16 inch thick films prepared above, dried for 24 hours at 60° C. in a vacuum oven, and weighed before immersion in a vial containing ink or the water/n-butanol solution. The vials were then placed in an oven at 60° C.

Samples were periodically removed from the swelling liquids, carefully dried with a paper towel, or in case of the inks, rinsed with water and patted dry, and weighed. The percentage weight gain was calculated from the formula: (swollen weight)-(original weight)/(original weight). The results are shown in Table 8. The weight gain after 3 days is reported for the specimens soaked in water/n-butanol, and the weight gain after 13 days is reported for the specimens soaked in cyan ink.

The glass transition (Tg) temperatures of each specimen were measured by DSC and are shown in Table 8 as well.

TABLE 8

| Adhesive Composition | Water/n-butanol | Cyan Ink | $T_g$ |
|---|---|---|---|
| 3 | 1.9% | 1.9% | 129° C. |
| 4 | 2.2% | 2.3% | 111° C. |
| 5 | 2.4% | 2.4% | 100° C. |
| 6 | 3.5% | 2.7% | 74° C. |
| 7 | 5.7% | 4.2% | 63° C. |
| 8 | 1.9% | 1.7% | 124° C. |
| 9 | 2.1% | 1.8% | 104° C. |
| 10 | 2.8% | 2.1% | 89° C. |
| 11 | 3.3% | 2.3% | 77° C. |
| 12 | 5.5% | 3.8% | 68° C. |
| 13 | 1.9% | 1.9% | 127° C. |
| 14 | 3.0% | 2.1% | 115° C. |
| 15 | 3.7% | 3.0% | 85° C. |
| 16 | 3.9% | 4.0% | 69° C. |
| C3 | 2.0% | 1.8% | 123° C. |
| C4 | 4.0% | 2.5% | 107° C. |
| C5 | 12.1% | 9.9% | 44° C. and 92° C. |
| C6 | 3.6% | 3.0% | 102° C. |
| C7 | 8.8% | 7.7% | 75° C. |
| C8 | 2.2% | 2.1% | 133° C. |
| C9 | 4.3% | 3.5% | 47° C. and 115° C. |
| C10 | 9.8% | 8.7% | 47° C. and 103° C. |
| C11 | 2.4% | 2.1% | 133° C. |
| C12 | 3.1% | 2.6% | 114° C. |
| C13 | 4.2% | 3.4% | 107° C. |
| C14 | 2.5% | 2.2% | 114° C. |
| C15 | 4.1% | 4.1% | 81° C. |
| C16 | 8.0% | 8.5% | 62° C. |

The data in table 8 demonstrate that Experimental Compounds 1, 2, and 3 can be used to lower the glass transition temperature of an epoxy resin while maintaining solvent and ink resistance in the resin. Conventional epoxy flexibilizers such as PolyTHF diamine, ANCAMINE 1922A, and DER 732 also lower the glass transition temperatures of epoxy resins but more dramatically decrease the solvent and ink resistance of the resins. A specific comparison of adhesive Composition 10 and Comparative Adhesive Composition 5, which both have glass transition temperatures of 90° C., shows this affect. Adhesive Composition 10 swells in water/n-butanol and 2.1 percent in cyan ink while Comparative Adhesive Composition 5 swells 12.1 percent in water/n-butanol and 9.9 percent in cyan ink. The data also demonstrate that samples prepared from Experimental Compounds 1, 2, and 3 have improved ink resistance than samples made from epoxy terminated polysulfide polymers available from Morton International. Both Adhesive Composition 12 and Comparative Adhesive Composition C16 have glass transition temperatures of approximately 65° C. Comparative Adhesive Composition C16 swells 2.2 times more in ink than Adhesive Composition 12.

Example 6

Example 6 demonstrates the adhesion of several epoxy formulations containing Experimental Compound 1 to various plastics. Several different levels of Experimental Compound 1 were used to make Adhesive Compositions A-H, shown in Table 9. The epoxy resin, ANCAMINE 1922A, and the Experimental Compound 1 were mixed by hand and cured at ambient conditions for at least 24 hours.

TABLE 9

| Adhesive Compositions | EPON 828 | Experimental Compound 1 | ANCAMINE 1922A |
|---|---|---|---|
| A | 5.0 g | 0.28 g | 1.54 g |
| B | 4.5 g | 0.53 g | 1.46 g |
| C | 4.25 g | 0.79 g | 1.46 g |
| D | 4.0 g | 1.21 g | 1.5 g |
| E | 3.5 g | 1.58 g | 1.46 g |
| F | 2.5 g | 2.63 g | 1.46 g |
| G | 1.5 g | 3.68 g | 1.46 g |
| H | 0.0 g | 5.0 g | 1.39 g |
| Control | 10.0 g | 0.0 g | 2.92 g |

The compositions were evaluated using the Qualitative Adhesion Test (peel mode) (described in the Test Methods section above). The composition was vacuum degassed prior to preparing the test specimens. The results are shown in Table 10.

TABLE 10

| | ABS | PC |
|---|---|---|
| A | Fairly Easy | Fairly Easy |
| B | Stuck | Stuck |
| C | Stuck | Stuck |
| D | Stuck | Stuck |
| E | Stuck | Stuck |
| F | Stuck | Stuck |
| Control | Fairly Easy | Fairly Easy |

The data in Table 10 indicate that when Experimental Compound 1 is mixed with EPON 828 in a ratio of 10/90 to 50/50, the resulting adhesives adhere tenaciously to ABS and Polycarbonate. These adhesives containing Experimental Compound 1 have much improved adhesion to these plastics than the control, which contains no flexibilizer. Adhesive Compositions G and H cure into rubbery materials that were easily removed from the plastic surfaces.

Example 7

Example 7 demonstrates that an imidazole cured epoxy resin formulation containing Experimental Compound 1 also adheres very well to some plastics. EPON 828 (10.0 g) and D. E. H. 85 (1.0 g) were combined and heated to 110° C. to melt the D. E. H. 85. The sample was cooled to room temperature, and the thioether epoxy (2.0 g) was added followed by 2-ethyl-4-methylimidazole (0.52 g). The compositions were evaluated using the Qualitative Adhesion Test (peel mode). The plastic samples were heated to 130° C. for 15 minutes to complete the cure. The results are shown in Table 11.

TABLE 11

| Plastic | Rating |
|---|---|
| ABS | Stuck |
| PC | Difficult |

Example 8

Example 8 demonstrates that Experimental Compound 3 can be used to make an adhesive formulation that adheres well to plastics. EPON 828 (4.0 g), Experimental Compound 3 (1.01 g), and ANCAMINE 1922A (1.43 g) were mixed by hand and cured at ambient conditions for at least 24 hours.

The samples were evaluated using the Qualitative Adhesion Test (peel mode) (described in the Test Methods section above). The composition was vacuum degassed prior to preparing the test specimens.

Removal of the adhesive composition made from Experimental Compound 3 from ABS, PMMA, and Polycarbonate was classified as difficult.

Comparative Example 3

Comparative Example 3 demonstrates the adhesion of several epoxy formulations containing an epoxy functional liquid polysulfide polymer to various plastics. ELP 612-A (Morton International, Chicago, Ill.) was used as the epoxy functional polysulfide. Several different levels 612-A were used to make Compositions 612-A A-H, as shown in Table 12. The epoxy resin, ANCAMINE 1922A, and the 612-A were mixed by hand and cured at ambient conditions for at least 24 hours.

TABLE 12

|  | EPON 828 | ELP 612 | 1922A |
| --- | --- | --- | --- |
| 612-A | 4.5 g | 0.5 g | 1.38 g |
| 612-B | 4.0 g | 0.94 g | 1.3 g |
| 612-C | 3.5 g | 1.31 g | 1.2 g |
| 612-D | 3.0 g | 1.82 g | 1.13 g |
| 612-E | 2.5 g | 2.27 g | 1.04 g |
| 612-F | 1.5 g | 3.18 g | 0.88 g |
| 612-G | 0.8 g | 3.95 g | 0.78 g |
| 612-H | 0.0 g | 5.0 g | 0.69 g |

The samples were evaluated using the Qualitative Adhesion Test (peel mode) (described in the Test Methods section above). The composition was vacuum degassed prior to preparing the test specimens. The results are shown in Table 13.

TABLE 13

|  | ABS | PC |
| --- | --- | --- |
| 612-A | Easy | Fairly Easy |
| 612-B | Easy | Fairly Easy |
| 612-C | Easy | Fairly Easy |
| 612-D | Easy | Fairly Easy |
| 612-E | Easy | Fairly Easy |
| 612-F | Easy | Fairly Easy |
| 612-G | Easy | Difficult |
| 612-H | Easy | Difficult |

The data in Table 13 can be compared to the data in Table 10. It is evident that the adhesion formulations made from Morton's 612-A do not adhere as well to ABS and PC as formulations made from Experimental Compound 1.

Comparative Example 4

Comparative Example 4 demonstrates the adhesion of several epoxy formulations containing ELP-3 to various plastics. ELP-3 (Morton International, Chicago, Ill.) is a epoxy functional liquid polysulfide polymer. Several different levels of ELP-3 were used to make Adhesive Compositions ELP-3 A-H, as shown in Table 14. The epoxy resin, ANCAMINE 1922A, and the ELP-3 were mixed by hand and cured at ambient conditions for at least 24 hours.

TABLE 14

|  | EPON 828 | ELP-3 | 1922A |
| --- | --- | --- | --- |
| ELP-A | 4.0 g | 0.83 g | 1.23 g |
| ELP-B | 3.5 g | 1.53 g | 1.14 g |
| ELP-C | 3.0 g | 2.08 g | 1.03 g |
| ELP-D | 2.5 g | 2.82 g | 0.94 g |
| ELP-E | 2.0 g | 3.37 g | 0.84 g |
| ELP-F | 1.2 g | 4.72 g | 0.70 g |
| ELP-G | 0.6 g | 5.5 g | 0.58 g |
| ELP-H | 0.0 g | 6.0 g | 0.45 g |
| ELP-I | 100 parts | 30 parts | 31.5 |

The samples were evaluated using the Qualitative Adhesion Test (peel mode) (described in the Test Methods section above). The composition was vacuum degassed prior to preparing the test specimens. The results are shown in Table 15.

TABLE 15

|  | ABS | PC |
| --- | --- | --- |
| ELP-A | Easy | Easy |
| ELP-B | Easy | Easy |
| ELP-C | Easy | Fairly Easy |
| ELP-D | Easy | Fairly Easy |
| ELP-E | Easy | Easy |
| ELP-F | Easy | Easy |
| ELP-G | Easy | Easy |
| ELP-H | Easy | Easy |
| ELP-I | Easy | Easy |

The data in Table 15 can be compared to the data in Table 10. It is evident that the adhesion formulations made from Morton's ELP-3 do not adhere as well to ABS and PC as formulations made from Experimental Compound 1.

Comparative Examples 5–8

Comparative Example 5 was an epoxy adhesive, commercially available from Minnesota Mining and Manufacturing Company, under the trade designation Scotch-Weld™ DP-460 (DP-460). It is a 2-part, 60-minute worklife, room temperature curing, high strength epoxy adhesive.

Comparative Example 6 was an epoxy adhesive, commercially available from Minnesota Mining and Manufacturing Company, under the trade designation Scotch-Weld™ 2216 (2216). It is a 2-part, 90-minute worklife, room-temperature curing epoxy adhesive.

Comparative Example 7 was an epoxy adhesive, commercially available from Minnesota Mining and Manufacturing Company as 3M Automotive Two-Part Epoxy Adhesive 5047 (5047). It is a 2-part, 120-minute worklife epoxy adhesive that can be cured at room temperature.

Comparative Example 8 was prepared by mixing EPON 828 (100 parts), an epoxy functional ether (30 parts) (DER 736, The Dow Chemical Company, Midland, Mich.), and 4,7,10-trioxa-1,13-tridecanediamine (37.6 parts) together at ambient conditions (C736).

Each of the Comparative Examples were used to prepare samples for the Qualitative Adhesion Test described above. The results of this test are shown below in Table 16.

TABLE 16

| Comparative Adhesive Composition | PC | ABS |
|---|---|---|
| DP-460 | Easy | Easy |
| 2216 | Stuck | Fairly Easy–Difficult |
| 5047 | Stuck | Easy |
| C736 | Easy | Fairly Easy–Difficult |

The above data show that none of the comparative adhesives have as good adhesion to ABS plastic as the adhesives of Example 6. The adhesion to ABS of the adhesives of Example 6 is also improved over an adhesive made as in Example 1, but substituting an equivalent epoxy-terminated ether structure that does not contain sulfur for the thioether di-epoxide (Comparative Example 8). The adhesion to ABS of the adhesives of Example 6 is also improved over several commercially available, fully formulated, epoxy adhesives (Comparative Examples 5–7).

Example 9

Example 9 describes the overlap shear strengths of bonds made with a thioether containing adhesive between two pieces of plastic. EPON 828 (100 parts), Experimental Compound 1 (30 parts), and ANCAMINE 1922A (37.6 parts) curative were mixed by hand at ambient conditions to provide Adhesive Composition I. The composition was degassed prior to preparing the test specimens. The measured Tg of the adhesive after cure was 50° C. Overlap shear measurements were carried out as described in the test methods section above, and the data are summarized in Table 17.

TABLE 17

| Substrate | Shear Strength (MPa) Adhesive Composition I | Shear Strength (MPa) DP 460 |
|---|---|---|
| Polycarbonate | >14 (exceeded instrument limits) | 2.7 |
| PMMA | 4 | 1.5 |
| ABS | >8 (substrate break) | 2.1 |

The overlap shear strength values for DP 460, a commercially available two-part epoxy adhesive from Minnesota Mining and Manufacturing Company, were obtained from the 3M™ Scotch-Weld™ technical data sheet for this product (September, 1997) and are also shown in Table 17. The samples were measured according to ASTM D 1002–72 using 25.4 mm wide specimens with a 12.7 mm long overlap. The bond line thickness was 0.13–0.20 mm. Testing was done with a grip separation rate of 50.8 mm/min. The plastic substrates were approximately 3 mm thick and were prepared by rubbing with an isopropyl alcohol soaked swab.

The overlap shear strength values for Adhesive Composition I are in excess of those reported for DP 460 for polycarbonate, PMMA, and ABS. These data indicate that Adhesive Composition I adheres better to polycarbonate, PMMS, and ABS than DP 460.

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. An article of manufacture comprising:
    a substrate comprising silicon, noble metal, plastics, polyimide, or combinations thereof; and an adhesive comprising the reaction product of:
    epoxy resin;
        catalyst or curative; and
        epoxy reactive thioether-containing compound, wherein the epoxy reactive thioether-containing compound comprises an aliphatic thioether di-epoxide, adhesively bonded to the substrate.
2. The article of claim 1 wherein the plastic is selected from the group consisting of acrylonitrile-butadiene-styrene, poly(methyl methacrylate), polycarbonate, or mixtures thereof, and wherein the epoxy reactive thioether-containing compound has a molecular weight of from about 320 to about 650.
3. The article of claim 1 wherein the noble metal is selected from the group consisting of gold, platinum, palladium, silver, iridium, and combinations thereof.
4. The article of claim 1 wherein the silicon is selected from the group consisting of silicon dioxide, silicon die, and combinations thereof.
5. The article of claim 1 wherein the epoxy resin comprises a polyfunctional phenolic glycidyl ether epoxy resin.
6. The article of claim 1 wherein the epoxy reactive thioether-containing compound is selected from the group consisting of 2-{[3-({2-[(2-{[3-(2-oxiranylmethoxy)propyl]sulfanyl}ethyl)sulfanyl]ethyl}sulfanyl)propoxy]methyl}oxirane; 2-({3-[(6-{[3-(2-oxiranylmethoxy)propyl]sulfanyl}hexyl)sulfanyl]propoxy}methyl)oxirane; and 2-({3-[(2-{[3-(2-oxiranylmethoxy)propyl]sulfanyl}ethoxyethoxyethyl)sulfanyl]propoxy}methyl)oxirane, and combinations thereof.
7. A method of bonding a substrate comprising the steps of:
    contacting the substrate with an adhesive composition comprising a mixture of: epoxy resin; catalyst or curative; and epoxy reactive thioether-containing compound, wherein the epoxy reactive thioether-containing compound comprises an aliphatic thioether di-epoxide; and
    curing the adhesive composition, wherein the substrate comprises silicon, noble metal, plastics, polyimide, or combinations thereof.
8. The method of claim 7 wherein the plastic is selected from the group consisting of acrylonitrile-butadiene-styrene, poly(methyl methacrylate), polycarbonate, or mixtures thereof, and wherein the epoxy reactive thioether-containing compound has a molecular weight of from about 320 to about 650.
9. The method of claim 7 wherein the substrate is a print head or an inkjet cartridge.
10. A curable adhesive composition useful for bonding substrates comprising silicon, noble metal, plastics, polyimide, or a combination thereof comprising a mixture of:
    epoxy resin;
    catalyst or curative; and
    epoxy reactive thioether-containing compound, wherein the epoxy reactive thioether-containing compound comprises an aliphatic thioether di-epoxide.
11. The curable adhesive composition of claim 10 wherein the epoxy reactive thioether-containing compound has a molecular weight of from about 320 to about 650.
12. The curable adhesive composition of claim 10 wherein the epoxy resin comprises a polyfunctional phenolic glycidyl ether epoxy resin.

13. The curable adhesive composition of claim 10 wherein the epoxy reactive thioether-containing compound is selected from the group consisting of 2-{[3-({2-[(2-{[3-(2-oxiranylmethoxy)propyl]sulfanyl}ethyl)sulfanyl]ethyl}sulfanyl)propoxy]methyl}oxirane; 2({3-[(6-{[3-(2-oxiranylmethoxy)propyl]sulfanyl}hexyl)sulfanyl]propoxy}methyl)oxirane; and 2-({3-[(2-{[3-(2-oxiranylmethoxy)propyl]sulfanyl}ethoxyethoxyethyl)sulfanyl]propoxy}methyl)oxirane, and combinations thereof.

14. The curable adhesive composition of claim 10 wherein the epoxy reactive thioether-containing compound is present in the adhesive composition at a level of from about 10 to about 80 parts by weight.

15. The curable adhesive composition of claim 14 wherein the epoxy resin is present in the adhesive composition at a level of from about 20 to about 80 parts by weight.

16. The curable adhesive composition of claim 15 wherein the curative comprises a poly(oxyhydrocarbolene) diamine.

17. The curable adhesive composition of claim 10 further comprising a coupling agent, a filler, or a combination thereof.

18. The curable adhesive composition of claim 15 wherein the catalyst comprises an imidazole.

19. An adhesive useful for bonding substrates comprising silicon, noble metal, plastics, polyimide, or a combination thereof comprising the reaction product of:
    epoxy resin;
    catalyst or curative; and
    epoxy reactive thioether-containing compound, wherein the epoxy reactive thioether-containing compound comprises an aliphatic thioether di-epoxide.

20. The adhesive of claim 19 wherein the epoxy reactive thioether-containing compound has a molecular weight of from about 320 to about 650.

21. The adhesive of claim 19 wherein the epoxy reactive thioether-containing compound is selected from the group consisting of 2-{[3-({2-[(2-{[3-(2-oxiranylmethoxy)propyl]sulfanyl{ethyl)sulfanyl]ethyl}sulfanyl)propoxy]methyl}oxirane; 2({3-[(6-{[3-(2-oxiranylmethoxy)propyl]sulfanyl}hexyl)sulfanyl]propoxy}methyl)oxirane; and 2-({3-[(2-{[3-(2-oxiranylmethoxy)propyl]sulfanyl}ethoxyethoxyethyl)sulfanyl]propoxy}methyl)oxirane, and combinations thereof.

22. The adhesive of claim 19 wherein the catalyst is an imidazole.

23. The adhesive of claim 19 wherein the curative is a polyamine.

24. The adhesive of claim 19 further comprising an additive comprising silicon atoms.

25. The adhesive of claim 19 having low-stress and water and solvent resistance.

26. A method of flexibilizing and improving the solvent and/or water resistance of an epoxy resin adhesive comprising the steps of:
    adding from about 10 to about 80 parts by weight of an aliphatic thioether di-epoxide to a curable epoxy resin adhesive composition; and curing the epoxy resin adhesive composition to form the solvent and/or water resistant epoxy resin adhesive.

27. The method of claim 26 wherein the epoxy reactive thioether-containing compound is selected from the group consisting of 2-{[3-({2-[(2-{[3-(2-oxiranylmethoxy)propyl]sulfanyl}ethyl)sulfanyl]ethyl}sulfanyl)propoxy]methyl}oxirane; 2({3-[(6-{[3-(2-oxiranylmethoxy)propyl]sulfanyl}hexyl)sulfanyl]propoxy}methyl)oxirane; and 2-({3-[(2-{[3-(2-oxiranylmethoxy)propyl]sulfanyl}ethoxyethoxyethyl)sulfanyl]propoxy}methyl)oxirane, and combinations thereof.

28. The method of claim 26 wherein the epoxy resin comprises a polyfunctional phenolic glycidyl ether epoxy resin.

29. The method of claim 26 wherein the curative comprises an epoxy reactive amine.

30. The method of claim 26 wherein the catalyst comprises an imidazole.

31. The article of claim 1 wherein the substrate comprises polyimide.

32. The method of claim 7 wherein the epoxy reactive thioether-containing compound has a molecular weight of from about 320 to about 650.

33. A method of flexibilizing and improving the solvent and/or water resistance of an epoxy resin adhesive comprising the steps of:
    adding from about 10 to about 80 parts by weight of aliphatic thioether di-epoxide to a curable epoxy resin adhesive composition wherein the epoxy resin comprises a polyfunctional phenolic glycidyl ether epoxy resin; and
    uring the epoxy resin adhesive composition to form the solvent and/or water resistant epoxy resin adhesive.

34. A method of flexibilizing and improving the solvent and/or water resistance of an epoxy resin adhesive comprising the steps of:
    adding from about 10 to about 80 parts by weight of aliphatic thioether di-epoxide to a curable epoxy resin adhesive composition containing a curative which comprises an epoxy reactive amine; and
    curing the epoxy resin adhesive composition to form the solvent and/or water resistant epoxy resin adhesive.

35. A method of flexibilizing and improving the solvent and/or water resistance of an epoxy resin adhesive comprising the steps of:
    adding from about 10 to about 80 parts by weight of aliphatic thioether di-epoxide to a curable epoxy resin adhesive composition containing a catalyst which comprises an imidizole; and
    curing the epoxy resin adhesive composition to form the solvent and/or water resistant epoxy resin adhesive.

36. A curable adhesive composition useful for bonding substrates comprising silicon, noble metal, plastics, polyimide, or a combination thereof comprising a mixture of:
    epoxy resin present in the adhesive composition at a level of from about 20 to about 80 parts by weight;
    catalyst or curative comprising a poly(oxyhydrocarbolene) diamine; and epoxy reactive thioether-containing compound, wherein the epoxy reactive thioether-containing compound comprises a thioether di-epoxide and wherein the epoxy reactive thioether-containing compound is present in the adhesive composition at a level of from about 10 to about 80 parts by weight.

* * * * *

UNITED STATES PATENT AND TRADEMARK OFFICE
CERTIFICATE OF CORRECTION

PATENT NO. : 6,800,371 B2
APPLICATION NO. : 09/801234
DATED : October 5, 2004
INVENTOR(S) : Kathleen B. Gross Page 1 of 1

It is certified that error appears in the above-identified patent and that said Letters Patent is hereby corrected as shown below:

COLUMN 8,
Line 67, delete "(t2" and insert in place thereof -- ({2--.

Column 11,
Line 42, insert -- inferior-- following "C2 are".
Line 43, insert -- and peel -- following "die shear".

Column12,
Line 59, delete "compositions" and insert in place thereof -- Compositions --.

Column 13,
Line 41 delete "table" and insert in place thereof -- Table --.
Line 48, delete "adhesive" and insert in place thereof -- Adhesive --.
Line 51, insert -- 2.8 percent -- following "swells".

Column 18,
Line 29, delete "2-{" and insert in place thereof -- 2( --.

Column 19,
Line 41, delete "sulfanyl{" and insert in place thereof -- sulfanyl} --.

Column 20,
Line 28, delete "uring" and insert in place thereof -- curing --.

Signed and Sealed this

Sixteenth Day of January, 2007

JON W. DUDAS
*Director of the United States Patent and Trademark Office*